(12) United States Patent
Hidai et al.

(10) Patent No.: US 7,634,611 B2
(45) Date of Patent: Dec. 15, 2009

(54) MULTI-MASTER, CHAINED TWO-WIRE SERIAL BUS

(75) Inventors: Takashi Hidai, Palo Alto, CA (US); Slawomir K. Iinickl, Los Altos Hills, CA (US); Martin Curran-Gray, Dunfermline (GB)

(73) Assignee: Agilent Technologies, Inc., Santa Clara, CA (US)

( * ) Notice: Subject to any disclaimer, the term of this patent is extended or adjusted under 35 U.S.C. 154(b) by 186 days.

(21) Appl. No.: 11/378,884

(22) Filed: Mar. 17, 2006

(65) Prior Publication Data

US 2007/0220190 A1 Sep. 20, 2007

(51) Int. Cl.
*G06F 13/36* (2006.01)
(52) U.S. Cl. .................................. 710/314; 710/310
(58) Field of Classification Search .............. 710/306, 710/310–314
See application file for complete search history.

(56) References Cited

U.S. PATENT DOCUMENTS

2004/0255195 A1* 12/2004 Larson et al. ................ 714/30

2005/0246475 A1* 11/2005 Ervin ........................ 710/306

OTHER PUBLICATIONS

"The I²C-Bus Specification," Version 2.1, Jan. 2000, Phillips Semiconductors, p. 1-46.
"Dual Bidirectional I²C-Bus and SMBus Repeater," Texas Instruments, SCPS150-Dec. 2005.
"The I²C-bus and how to use it (including specifications)," 1995 Update, Apr. 1995, Phillips Semiconductors, p. 1-24.

* cited by examiner

*Primary Examiner*—Clifford H Knoll

(57) ABSTRACT

Aspects of the disclosure embody a multi-master two-wire serial bus that comprises two or more chained two-wire serial busses. The chained two-wire serial busses include a host two-wire serial bus with a first master device and one or more slave devices. One or more chained two-wire serial busses are coupled to the host bus wherein one or more slave devices on the host two-wire serial bus operate as second master devices, which comprise a digital state machine including a two-wire serial slave component coupled to the master device and a two-wire serial master component coupled to the slave devices on the chained two-wire serial bus. The digital state machine emulates a slave device on the host two-wire serial bus and a master device on the chained two-wire serial bus.

17 Claims, 6 Drawing Sheets

MULTI-MASTER, CHAINED TWO-WIRE SERIAL BUS

BACKGROUND

Data transmission or communications between two electrical devices or components often occurs over a network called a "bus." A bus interconnects two or more devices or components and allows signals to be sent and/or received by one or more devices connected to the bus. The bus system generally functions according to a protocol, standard, or predetermined design.

One such bus system is a two-wire serial bus. For example, an inter-integrated circuit (I2C) bus is a two-wire serial bus. A simplified two-wire serial bus system 100 is shown in FIG. 1. The two-wire serial bus system typically includes a master device 102 interconnected with one or more slave devices 104, 106, and 108. The master device 102 can send data or messages to or receive data or messages from the slave devices 104, 106, and 108 via the bus 110. Generally, the master device 102 controls all communications on the two-wire serial bus system 100.

Unfortunately, two-wire serial bus systems, such as the two-wire serial bus system 100 in FIG. 1, often require complicated designs to implement a multi-master bus, which is a bus that has two or more master devices controlling the bus. In addition, many applications, such as network equipment that connects a router line card to a gigabit interface converter, for example, gigabit interface converters (GBIC), small form factor pluggable (SFP) converters, and XFP converters, only allow a single master-slave configuration and do not support a multi-master bus.

SUMMARY

In general terms, this document is directed to circuits and methods for providing a multi-master, chained two-wire serial bus.

One aspect is a multi-master two-wire serial bus that comprises two or more chained two-wire serial busses. The chained two-wire serial busses include a host two-wire serial bus with a first master device and one or more slave devices. One or more chained two-wire serial busses are coupled to the host bus. The chained two-wire serial bus includes a second master device, which is also a slave device on the host two-wire serial bus, and one or more slave devices.

Another aspect is a digital state machine that is operable to function as both a slave device on a host two-wire serial bus and as a master device on a chained two-wire serial bus. The digital state machine includes a two-wire serial slave component that is operable to send data to and receive data from a master device on the host two-wire serial bus. The digital state machine further includes a two-wire serial master component that is operable to send data to and receive data from one or more slave devices on the chained two-wire serial bus. Both the two-wire serial slave component and the two-wire serial master component are coupled to an emulation memory. The emulation memory is operable to store or provide data received from a master device on the host two-wire serial bus or received from a slave device on the chained two-wire serial bus.

Yet another aspect is a method for transferring data between chained two-wire serial busses. The method comprises receiving data from a first device, either a slave device or a master device, on a first bus, either the host two-wire serial bus or a chained two-wire serial bus. Then, the data is stored in the emulation memory of the digital state machine. The data in the emulation memory is then extracted and sent to a second device on a second bus.

DETAILED DESCRIPTION

Figure 1:
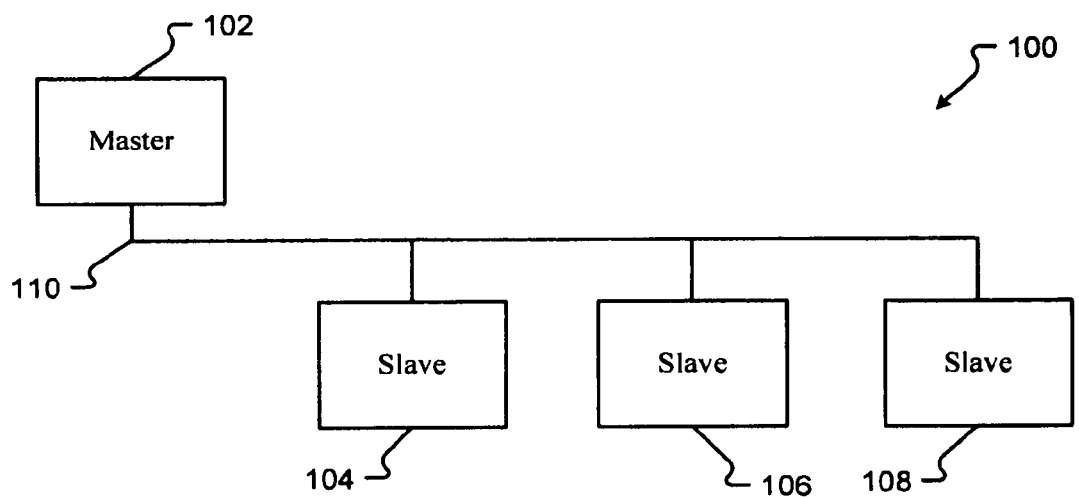
FIG. 1 is a schematic diagram of a two-wire serial bus system as known in the prior art.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Figure 2:
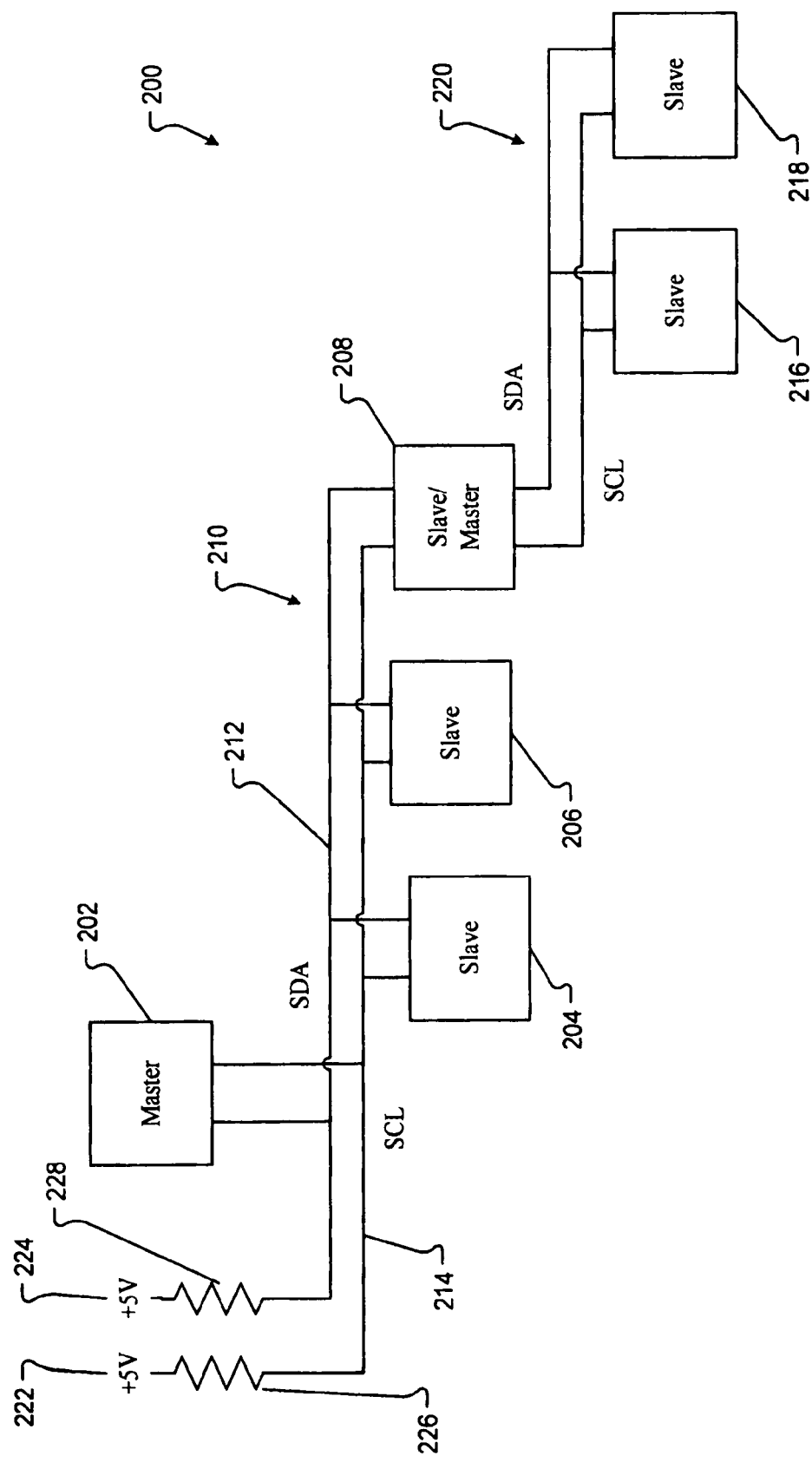
FIG. 2 is a schematic diagram of an embodiment of a multi-master, chained two-wire serial bus system.

In an exemplary embodiment, a multi-master, two-wire serial bus system 200, as shown in FIG. 2, includes two or more chained busses 210 and 220. A host bus 210 includes a master device 202 and three slave devices 204, 206 and 208. A master device can be a network device, such as a router line card. A slave device may also be a network device, such as a GBIC, SFP or XFP. Other embodiments of the host bus 210 or any chained bus may include more or fewer slave devices than shown in FIG. 2. The second or chained bus 220 includes another master device 208, which is also a slave device on the host bus 210, and two slave devices 216 and 218. All devices or components described herein can be coupled or connected together using any type of suitable data connection that allows the devices to interoperate, regardless of whether the data connection is wired or wireless.

Further embodiments may include one or more other chained busses. For example, slave device 204 may also function as another master device for another chained bus that includes one or more other slave devices. Slave device 218 may also function as a master device for another chained bus connected to slave device 218 and including one or more other slave devices. As such, the multi-master, two-wire serial bus system 200 is capable of numerous configurations. In addition, the multi-master, two-wire serial bus system 200 provides a multi-master, two-wire serial bus, but there is only one master for each two-wire serial bus, whether a host two-wire serial bus 210 or a chained two-wire serial bus, such as two-wire serial bus 220. Thus, the multi-master, two-wire serial bus system 200 can create a multi-master, two-wire serial bus system 200 with devices that only allow a single master device on the two-wire serial bus, such as network equipment.

The two-wire serial bus includes two circuits, a clock circuit (SCL) 214 and a data circuit (SDA) 212. Two-wire serial busses may be "open drain" systems where the nominal voltage on the bus is high, logic one, and the devices pull the voltage low, logic zero. In embodiments of two-wire serial bus applications, logic 1 may be a voltage above 3.5 volts and a logic zero may be a voltage below 0.6 volts. The circuits or busses can be connected to a voltage source, such as voltage sources 222 and 224, by "pull-up resistors," such as resistors 226 and 228. The pull-up resistors help the circuits maintain a high state (a logic one) when not being pulled down by a master device 202 or a slave device 204, 206 or 208 on the two-wire serial busses 210.

Figure 3:
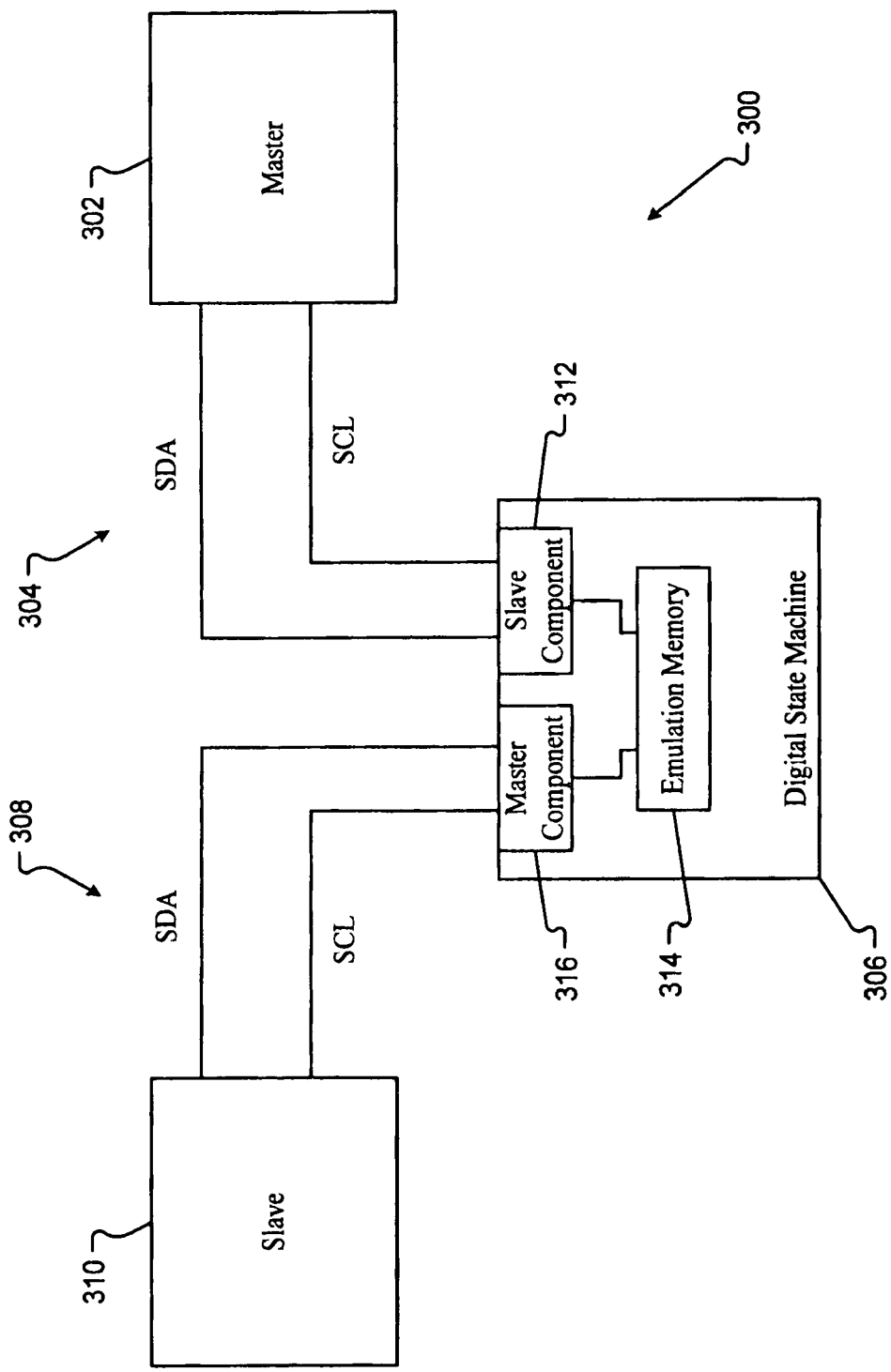
FIG. 3 is a block diagram of an embodiment of a digital state machine operable to function as both a slave on a first two-wire serial bus and as a master on a second two-wire serial bus.

To chain two or more two-wire serial busses together, one slave device, such as slave device 208 (FIG. 2), implements a digital state machine 306 as shown in FIG. 3. The digital state machine is implemented in a network device, such as a microprocessor, field programmable gate array (FPGA), application specific integrated circuit (ASIC), or other device operable to perform the functions described herein. A slave device 310 is disconnected from the host two-wire serial bus 304 and connected to the slave interface bus 308. The two-wire serial host interface 304 is connected to the two-wire serial slave component 312, also referred to simply as the slave component, of the digital state machine 306. Likewise, the slave interface bus 308 is connected to the two-wire serial master component 316, also referred to simply as the master component.

Both the two-wire serial master component and the two-wire serial slave component are connected to an emulation memory 314. The emulation memory is any external or internal memory, provided in any type of memory device or technology, such as RAM, PROM, magnetic media, optical media, or other system, that can perform the functions described herein. The emulation memory 314 stores or "emulates" all the data maintained or generated from the slave device(s) 310. In the exemplary embodiment, the emulation memory 314 stores the same data at the same address with the same offset as the slave device 310. For example, if a slave device has an address of A0, the data for the slave device is stored in the emulation memory 314 at address A0. As such, the master device 302 on the host bus 304 may interface with the digital state machine 306 and write or read data to the emulation memory 314 as if interfacing with a slave device 310 on the slave interface bus 308.

Figure 4:
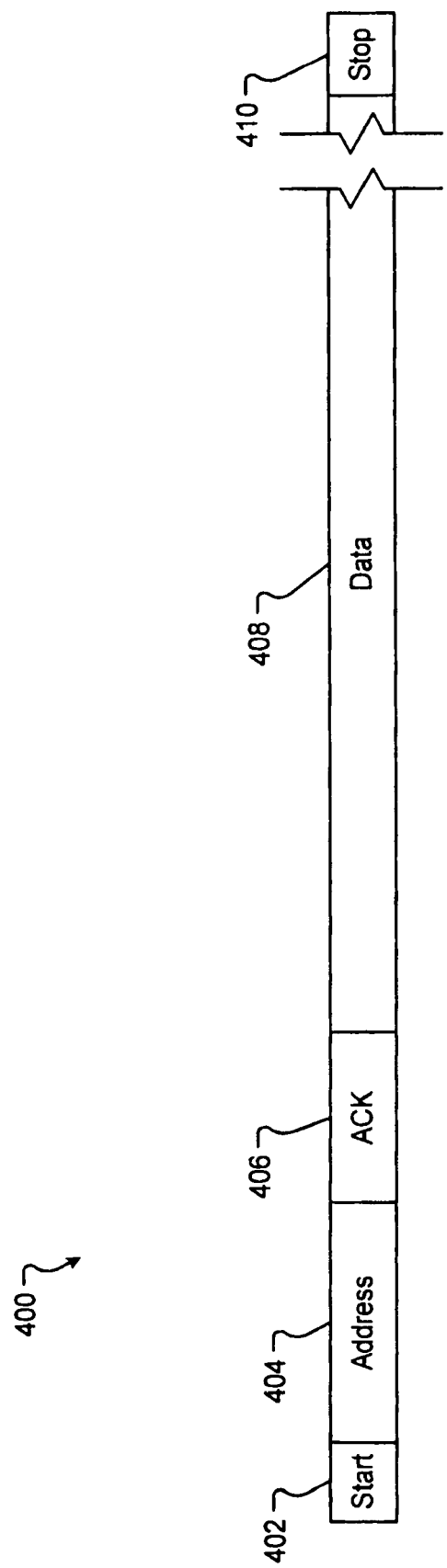
FIG. 4 is an exemplary data block diagram for a data transfer on a two-wire serial bus.

An exemplary block diagram of two-wire serial communication is shown in FIG. 4. The two-wire serial transaction 400 begins with the issuance of a START condition 402. A master device transmits an address 404. In further embodiments, a READ/WRITE (R/W) signal may also be transmitted. A slave device having the address 404 responds with an acknowledge signal 406. A data word 408 is then transmitted. In a READ transaction, the slave device sends the data word 408 to the master device. The data word 408 may be any number of bits, such as an 8-bit word, which is also called a byte. In further embodiments, the master device may send an acknowledge signal to the slave device that confirms the master device received the data word. In a WRITE transaction, the master device sends the data word 408 and the slave device may send an acknowledge signal. Further data words and acknowledge signals may follow until all the data is transmitted. In other embodiments, the data word may be a stream of data that is not broken into separate packets. After the data is transmitted, the master device issues a STOP condition 410.

In another exemplary embodiment, a two-wire serial transaction to send data from a master device to a slave device begins at some time t0. To begin the two-wire serial transaction, the master device issues a START condition by pulling the data line low while the clock line remains high. The START condition acts as an "attention" signal alerting all the slave devices to be ready for a data transfer.

After the START condition, the clock line (SCL) begins transmitting a clock. First, the master device sends an address. The slave device receives the address and compares the address to its own address. If the addresses fail to match, the slave device waits for the STOP condition. If the addresses match, the slave device prepares to receive data.

The master device then sends a signal to alert the slave device that the transaction will be a WRITE operation and not a READ operation. In one embodiment, the READ/WRITE signal is a single-bit indication. After receiving the address, the slave device sends an acknowledge signal. The master device may then begin transmitting byte sized data words to the slave device. After each data word, the slave device may send an acknowledge signal.

The transmission of data words can continue until all data is sent from the master device to the slave device. When the data transmission has successfully completed, the master device will issue the STOP condition. In one embodiment, the STOP condition occurs when the master device allows the data line to go high when the clock is high. At this point, the two-wire serial bus is released and all devices wait for another issuance of a START condition.

During a READ operation, the master device may send a READ bit. The slave device sends byte-sized data words to the master device. The master device sends the acknowledge signal after each data word. When all the data has been received, the master device issues the STOP condition.

Referring again to FIG. 3, the exemplary embodiment of the digital state machine 306 can "emulate" the two-wire serial transactions. In the exemplary embodiment, the emulation memory 314 is periodically updated. For example, the two-wire serial master component 316 completes a READ transaction with the one or more slave devices 310 on the slave bus 308. The data received from the slave device(s) 310 is stored to the emulation memory 314 using the same address, offsets, and other formats. The updates of the emulation memory 314 may occur every few seconds, every few hours, daily, or at any interval that will ensure the emulation memory 314 accurately reflects the data stored at the slave device(s).

When the master device 302 on the master bus 304 issues a READ request of a slave device 310, the READ transaction is emulated by the two-wire serial slave component 312. The two-wire serial slave component 312 receives the device address and compares the address to the address stored in the emulation memory 314. If the address matches an address in the emulation memory 314, the two-wire serial slave component 312 sends the acknowledge signal. The two-wire serial slave component 312 then begins reading the pertinent data from the periodically updated emulation memory 314 and sending the data to the master device 302. As such, the master device 302 interoperates with the slave component 312 in the same manner as it would interoperate with the slave device 310. Thus, the slave component 312 "emulates" the two-wire serial transaction.

In other embodiments, the emulation memory 314 may be updated during or for a two-wire serial transaction. Thus, the two-wire serial slave component 312 receives a READ request. The two-wire serial slave component 312 signals the master component 316 to obtain the current data from the slave device 310. The current data is stored to the emulation memory 314, read from the emulation memory 314, and sent to the master device 302. A delay in the communications to the master device 302 may be required to ensure the transfer of information from the slave device 310 to the emulation memory 314 is completed before sending the data to the master device 302.

In still other embodiments, the data within the emulation memory 314 is checked either in response to a READ request from a master device 302 or periodically. For example, a checksum or other data may be checked between the emulation memory 314 and the slave device 310 to determine if the emulation memory 314 is storing the most current information. If the checksum or other information does not match, an update of the emulation memory 314 may be done by a READ transaction between the master component 316 and the slave device 310.

A WRITE transaction begins with the two-wire serial master device 302 issues a WRITE request. The slave component 312 checks the address against the addresses stored in the emulation memory 314. If the addresses match, the slave component 312 issues the acknowledge signal and completes the WRITE transaction. The data is written to the emulation memory 314. The two-wire serial master component then completes a WRITE transaction with the slave device 310 and writes the data from the emulation memory 314 to the slave device 310. In embodiments, a data present flag or other indication alerts the master component 316 that a data write is requested to one or more slave devices 310.

Figure 5:
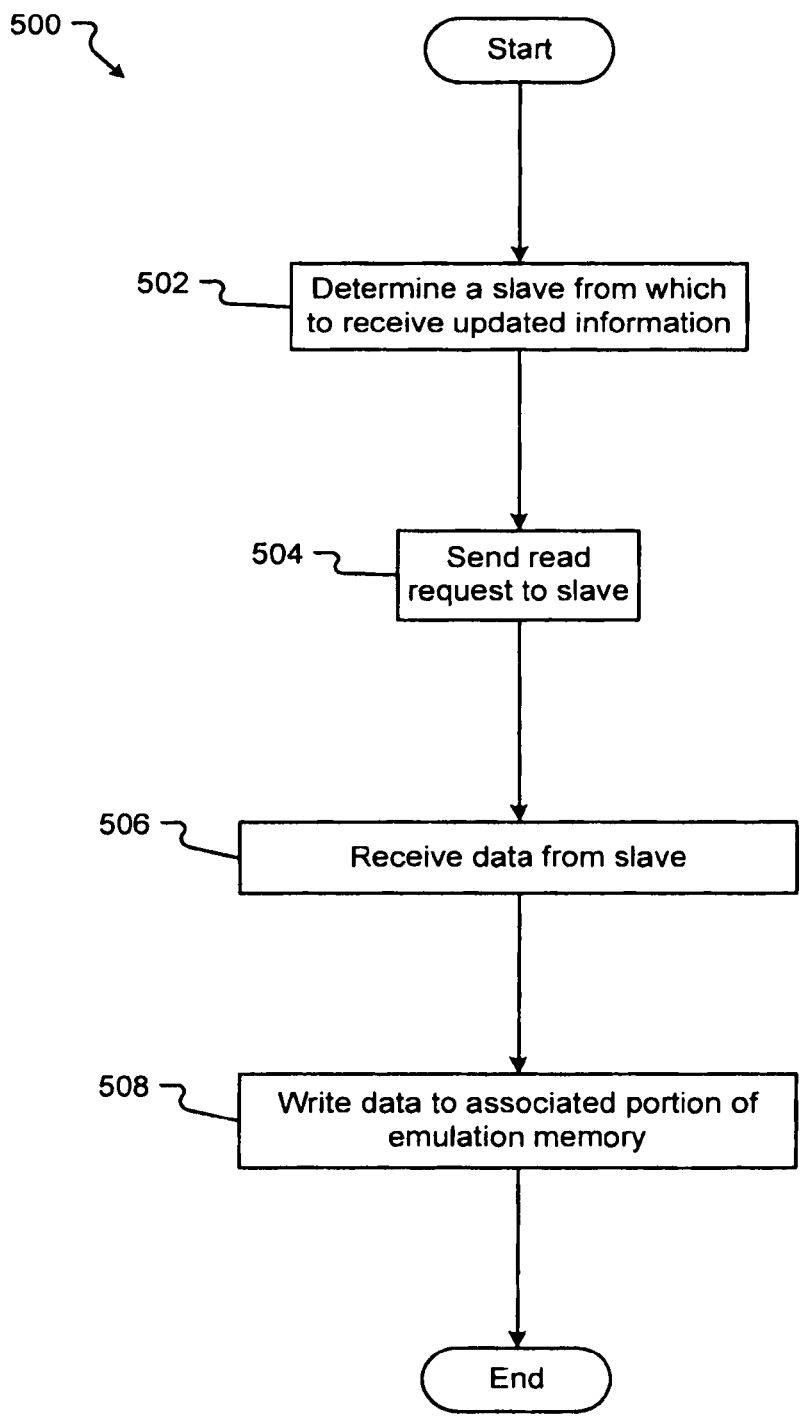
FIG. 5 shows an exemplary embodiment of a method for receiving data across chained two-wire serial busses.

A method 500 for reading data from a slave device, such as slave device 310 (FIG. 3), on a slave bus 308 (FIG. 3) of a chained two-wire serial bus system, such as two-wire serial bus system 300 (FIG. 3), is shown in FIG. 5. Determine operation 502 determines a slave device from which to receive data. In one embodiment, data in an emulation memory, such as emulation memory 314 (FIG. 3), is periodically updated. Each device having data emulated in the emulation memory is selected to update the associated data in the emulation memory.

Send operation 504 sends a READ request to the slave device. In the exemplary embodiment, a master component 316 (FIG. 3) issues a READ request as explained in conjunction with FIG. 4. The READ request initiates a two-wire serial transaction. Receive operation 506 receives data from the slave device. The slave device begins sending data in accordance with the two-wire serial transaction described in conjunction with FIG. 4. The master component receives the data. Write operation 508 writes the data to the portion of the emulation memory associated with the data and the slave device. As explained in conjunction with FIG. 3, the emulation memory has the same type and amount of data at the same address and offset as the data at the emulated slave device. In the exemplary embodiment, the data received from the slave device is used to update the associated data in the emulation memory by replacing the data that is at the same address and offset.

Figure 6:
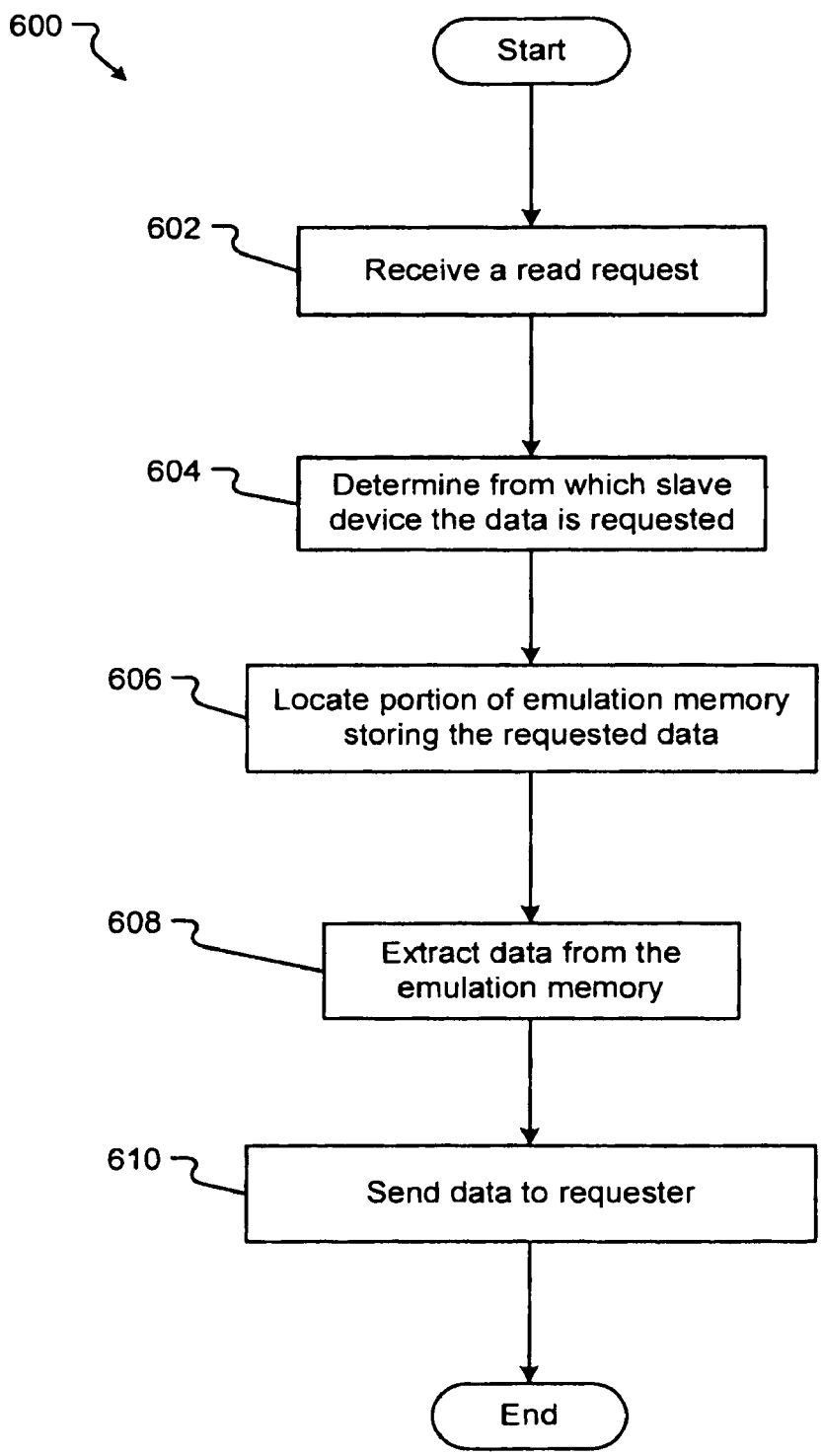
FIG. 6 shows an exemplary embodiment of a method for sending data across chained two-wire serial busses.

A method 600 for reading data from a digital state machine, such as digital state machine 306 (FIG. 3), on a host two-wire serial bus 304 (FIG. 3) of a chained two-wire serial bus system, such as bus system 300 (FIG. 3), is shown in FIG. 6. Receive operation 602 receives a READ request from a master device, such as master device 302 (FIG. 3), on the host two-wire serial bus. In the exemplary embodiment, a slave component, such as slave component 312 (FIG. 3), in the digital state machine receives the READ request. Determine operation 604 determines from which slave device the data is requested. In the exemplary embodiment, the slave component receives a device address from the master device. The slave component checks the address against the addresses stored in an emulation memory, such as emulation memory 314 (FIG. 3). If the received address matches an address in the emulation memory, the slave component sends an acknowledge signal.

Locate operation 606 locates the portion of the emulation memory storing the requested data. As explained in conjunction with FIG. 3, the emulation memory contains the same type and amount of data at the same address and offsets as the slave devices the emulation memory emulates. As such, the slave component locates the data in the emulation memory as if extracting memory from a slave device. Extract operation 608 extracts the data from the emulation memory. In the exemplary embodiment, the slave component reads the data from the emulation memory. Send operation 610 sends the extracted data to the requester, i.e., the master device. In the exemplary embodiment, the slave component completes a two-wire serial transaction with the master device until all the required data has been sent to the master device.

The various embodiments described above are provided by way of illustration only and should not be construed to limit the scope of the appended claims. Those skilled in the art will readily recognize various modifications and changes that may be made without following the example embodiments and applications illustrated and described herein, and without departing from the true spirit and scope of the following claims.

What is claimed is:

1. A multi-master and chained two-wire serial bus, comprising:
   a host two-wire serial bus, including: a first master device; one or more slave devices coupled to the first master device, each slave device operable to send data to and receive data from the first master device; and one or more chained two-wire serial busses coupled to the host two-wire serial bus,
   comprising: a second master device, the second master device also being a slave device on the host two-wire serial bus, the second master device operable to send data to and receive data from the first master device; and one or more other slave devices coupled to the second master device, each other slave device operable to send data to and receive data from the second master device; wherein the second master device comprises an emulation memory operable to: store data received from the first master device or received from the one or more other slave devices and to emulate data stored at one or more of the other slave devices on one of the chained two-wire serial busses; and wherein the emulation memory stores the same type and amount of data and at the same address and offset as the one or more slave devices on the one of the chained two-wire serial busses.

2. The multi master and chained two-wire serial bus apparatus as defined in claim 1, wherein the first master device completes a two-wire serial transaction with the second master device to write data to or read data from the one or more other slave devices.

3. The multi master and chained two-wire serial bus apparatus as defined in claim 1, further comprising one or more other chained two-wire serial bus coupled to the one or more chained two-wire serial busses, including: a third master device, the third master device also being a slave device on the chained two-wire serial bus, the third master device operable to send data to and receive data from the second master device; and one or more further slave devices coupled to the third master device, each further slave device operable to send data to and receive data from the third master device.

4. The multi master and chained two-wire serial bus apparatus as defined in claim 1, wherein the second master device is a digital state machine.

5. A digital state machine operable to emulate both a two-wire serial master device and a two-wire serial slave device on chained two-wire serial busses, comprising:

a two-wire serial slave component, the two-wire serial slave component operable to send data to and receive data from a master device on a host two-wire serial bus; a two-wire serial master component, the two-wire serial master component operable to send data to and receive data from one or more slave devices on a second two-wire serial bus; and an emulation memory component coupled to the two-wire serial slave component and coupled to the two-wire serial master component, the emulation memory component operable to: store data received from a master device on the host two-wire serial bus or received from a slave device on the second two-wire serial bus, and to emulate data stored at one or more slave devices on the second two-wire serial bus, wherein the emulation memory stores the same type and amount of data and at the same address and offset as the one or more slave devices on the second two-wire serial bus.

6. The digital state machine as defined in claim 5, wherein the two-wire serial slave component emulates a two-wire serial transaction with the master device on the host two-wire serial bus.

7. The digital state machine as defined in claim 6, wherein during the emulated two-wire serial transaction the two-wire serial slave component writes data to or reads data from the emulation memory.

8. The digital state machine as defined in claim 5, wherein two-wire serial master component emulates a two-wire serial transaction with a slave device on the second two-wire serial bus.

9. The digital state machine as defined in claim 8, wherein during the emulated two-wire serial transaction the two-wire serial master component writes data to or reads data from the emulation memory.

10. A method for transferring data between a first device on a first two-wire serial bus and a second device on a second two-wire serial bus, the method comprising:
receiving data from the first device on the first bus; storing the data in an emulation memory in a digital state machine, the emulation memory having a format which matches a format of the first device, the data being stored in the emulation memory as per the format;
extracting the data from the emulation memory to send to the second device on the second bus; and sending the data to the second device on the second bus, wherein a format of the emulation memory which matches the format of the first device comprises one of (i) a same address, and (ii) a same offset.

11. A method as defined in claim 10, wherein the first device is a master device, the first bus is a host two-wire serial bus, the second device is a slave device, and the second two-wire serial bus is a chained two-wire serial bus that is chained to the host two-wire serial bus.

12. A method as defined in claim 11, wherein receiving data further comprises: receiving a START condition; receiving an address for the second device; receiving a WRITE signal; sending an acknowledge signal from a two-wire serial slave component, in the digital state machine, coupled to the master device on the host two-wire serial bus; receiving one or more data words at the two-wire serial slave component; and receiving a STOP condition.

13. A method as defined in claim 11, wherein sending data further comprises: issuing a START condition from a two-wire serial master component in the digital state machine; sending an address for the slave device; sending a WRITE signal; receiving an acknowledge signal; sending one or more data words from the two-wire serial master component to the slave device; and issuing a STOP condition.

14. A method as defined in claim 10, wherein the first device is a slave device, the first bus is a chained two-wire serial bus, the second device is a master device, and the second two-wire serial bus is a host two-wire serial bus, wherein the chained two-wire serial bus is chained to the host two-wire serial bus.

15. A method as defined in claim 14, wherein data is periodically received, from the one or more slave devices, and stored in the emulation memory.

16. A method as defined in claim 14, wherein receiving data further comprises: issuing a START condition from a two-wire serial master component in the digital state machine; sending an address for the slave device; sending a READ signal; receiving an acknowledge signal; receiving one or more data words at the two-wire serial master component from the slave device; and issuing a STOP condition.

17. A method as defined in claim 14, wherein sending data further comprises: receiving a START condition at a two-wire serial slave component coupled to the master device; receiving an address for the slave device; receiving a READ signal; sending an acknowledge signal from the two-wire serial slave component; sending one or more data words from the two-wire serial slave component to the master device; and receiving a STOP condition.

* * * * *

UNITED STATES PATENT AND TRADEMARK OFFICE
CERTIFICATE OF CORRECTION

PATENT NO. : 7,634,611 B2 Page 1 of 1
APPLICATION NO. : 11/378884
DATED : December 15, 2009
INVENTOR(S) : Takashi Hidai et al.

It is certified that error appears in the above-identified patent and that said Letters Patent is hereby corrected as shown below:

On the Title page, in Item (75), in "Inventors", in column 1, line 2, delete "Slawomir K. Iinickl" and insert -- Slawomir K. Ilnicki --, therefor.

Signed and Sealed this

Sixteenth Day of February, 2010

David J. Kappos
*Director of the United States Patent and Trademark Office*